United States Patent
Lafleur et al.

(10) Patent No.: US 8,778,493 B2
(45) Date of Patent: *Jul. 15, 2014

(54) IR-REFLECTING COMPOSITIONS

(71) Applicants: Edward E. Lafleur, Holland, PA (US); Luu T. Le, Glenside, PA (US); Edwin Nungesser, Horsham, PA (US)

(72) Inventors: Edward E. Lafleur, Holland, PA (US); Luu T. Le, Glenside, PA (US); Edwin Nungesser, Horsham, PA (US)

(73) Assignee: Rohm and Haas Company, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/859,929

(22) Filed: Apr. 10, 2013

(65) Prior Publication Data
US 2014/0005336 A1 Jan. 2, 2014

Related U.S. Application Data

(62) Division of application No. 13/237,453, filed on Sep. 20, 2011, now Pat. No. 8,436,096.

(51) Int. Cl.
| | |
|---|---|
| *G11B 9/00* | (2006.01) |
| *F21V 9/00* | (2006.01) |
| *F21V 9/04* | (2006.01) |
| *C08J 5/18* | (2006.01) |
| *C09D 5/33* | (2006.01) |
| *C08F 220/40* | (2006.01) |
| *C08F 220/18* | (2006.01) |
| *C08F 265/06* | (2006.01) |
| *C08F 222/10* | (2006.01) |
| *B82Y 20/00* | (2011.01) |
| *C08F 220/14* | (2006.01) |
| *C08L 51/00* | (2006.01) |
| *C09D 125/02* | (2006.01) |
| *C09D 7/12* | (2006.01) |
| *C08L 33/12* | (2006.01) |
| *C08F 285/00* | (2006.01) |

(52) U.S. Cl.
CPC .. *C08L 33/12* (2013.01); *C08J 5/18* (2013.01); *C09D 5/004* (2013.01); *C08F 220/40* (2013.01); *C08F 220/18* (2013.01); *C08F 265/06* (2013.01); *C08F 222/10* (2013.01); *B82Y 20/00* (2013.01); *C08F 220/14* (2013.01); *C08L 51/00* (2013.01); *C09D 125/02* (2013.01); *C09D 7/125* (2013.01); *C08F 2220/1825* (2013.01); *C08F 285/00* (2013.01); *C09D 7/1275* (2013.01); *C09D 7/1283* (2013.01); *Y10S 977/779* (2013.01)
USPC ............ 428/338; 252/582; 252/587; 977/779

(58) Field of Classification Search
USPC .................... 428/338; 252/582, 587; 977/779
See application file for complete search history.

(56) References Cited

U.S. PATENT DOCUMENTS

| | | |
|---|---|---|
| 4,501,470 A | 2/1985 | Yeh |
| 5,237,004 A | 8/1993 | Wu et al. |
| 7,655,298 B2 | 2/2010 | Thies et al. |
| 7,768,602 B2 | 8/2010 | LaFleur et al. |
| 8,563,130 B2 * | 10/2013 | Chung et al. ............ 428/338 |
| 2006/0182968 A1 | 8/2006 | Yoshida et al. |
| 2007/0218291 A1 | 9/2007 | Chiou et al. |
| 2008/0182958 A1 | 7/2008 | Lafleur et al. |
| 2009/0015908 A1 | 1/2009 | Ando et al. |
| 2009/0097123 A1 | 4/2009 | LaFleur et al. |
| 2010/0015433 A1 | 1/2010 | Arfsten et al. |

FOREIGN PATENT DOCUMENTS

| | | |
|---|---|---|
| EP | 2343579 | 7/2011 |
| JP | 2009280693 | 3/2009 |

* cited by examiner

*Primary Examiner* — Nathan M Mutter
(74) *Attorney, Agent, or Firm* — Kenneth Crimaldi

(57) ABSTRACT

A composition comprising multistage polymeric particles having an average particle diameter from 0.5 to 15 μm and a Vicker's scale hardness from 100 to 700 Kgf/mm²; and a film-forming polymer having $T_g$ no greater than 80° C. The refractive index difference measured from 400 nm to 800 nm between the polymeric particles and the film-forming polymer is no greater than 0.02 and the average refractive index difference measured from 800 nm to 2500 nm between the polymeric particles and the film-forming polymer is at least 0.04.

8 Claims, No Drawings

IR-REFLECTING COMPOSITIONS

CROSS-REFERENCE TO RELATED APPLICATIONS

This application claims the benefit of priority under 35 U.S.C. §120 of U.S. patent application Ser. No. 13/237,453 filed on Sep. 20, 2011, and now U.S. Pat. No. 8,436,096.

This invention relates to polymeric particles which can be used to form an IR-reflective film which is particularly useful for construction of photovoltaic modules.

Optical filters for selection of a portion of the spectrum are well known. For example, U.S. Pat. No. 4,501,470 discloses an optical bandpass filter for this purpose. However, this filter requires a series of layers of varying composition and refractive index.

The problem addressed by the present invention is to provide polymeric particles which can be used to form an IR-reflective film which is particularly useful for construction of photovoltaic modules.

STATEMENT OF INVENTION

The present invention provides a composition comprising polymeric particles having: (a) an average particle diameter from 0.5 to 15 µm; and (b) a Vicker's scale hardness from 100 to 700 Kgf/mm$^2$; and a film-forming polymer having $T_g$ no greater than 80° C.; wherein an average refractive index difference measured from 400 nm to 800 nm between the polymeric particles and the film-forming polymer is no greater than 0.02 and an average refractive index difference measured from 800 nm to 2500 nm between the polymeric particles and the film-forming polymer is at least 0.04.

The present invention is further directed to a film comprising polymeric particles having: (a) an average particle diameter from 0.5 to 15 µm; and (b) a Vicker's scale hardness from 100 to 700 Kgf/mm$^2$; and a continuous polymeric phase having $T_g$ no greater than 80° C.; wherein an average refractive index difference measured from 400 nm to 800 nm between the polymeric particles and the continuous polymeric phase is no greater than 0.02 and an average refractive index difference measured from 800 nm to 2500 nm between the polymeric particles and the continuous polymeric phase is at least 0.04; and wherein an average distance between the polymeric particles is from 0.9 to 14 µm.

The present invention is further directed to a film comprising polymeric particles having: (a) an average particle diameter from 15 to 500 µm; and (b) a Vicker's scale hardness from 100 to 700 Kg f/mm$^2$; and a film-forming polymer having $T_g$ no greater than 80° C.; wherein an average refractive index difference measured from 400 nm to 800 nm between the polymeric particles and the continuous polymeric phase is no greater than 0.02 and an average refractive index difference measured from 800 nm to 2500 nm between the polymeric particles and the continuous polymeric phase is at least 0.04.

DETAILED DESCRIPTION

Percentages are weight percentages (wt %) and temperatures are in ° C., unless specified otherwise. RI values are determined at the sodium D line, where λ=589.29 nm at 20° C., unless specified otherwise. Polymeric particles comprise organic polymers, preferably addition polymers, and preferably are substantially spherical. Average particle diameter is determined as the arithmetic mean particle diameter. $T_g$ values are calculated from homopolymer $T_g$ values using the Fox equation; see *Bulletin of the American Physical Society* 1, 3, page 123 (1956). The $T_g$ of a polymeric particle whose composition varies throughout the particle is the weight average of the $T_g$ values of the different compositions in the particle. Weight percentages of monomers are calculated for each stage of a multistage polymer based on the total weight of monomers added to the polymerization mixture in that stage. As used herein the term "(meth)acrylic" refers to acrylic or methacrylic, and "(meth)acrylate" refers to acrylate or methacrylate. The term "(meth)acrylamide" refers to acrylamide (AM) or methacrylamide (MAM). "Acrylic monomers" include acrylic acid (AA), methacrylic acid (MAA), esters of AA and MAA, itaconic acid (IA), crotonic acid (CA), acrylamide (AM), methacrylamide (MAM), and derivatives of AM and MAM, e.g., alkyl (meth)acrylamides. Esters of AA and MAA include, but are not limited to, alkyl, hydroxyalkyl, phosphoalkyl and sulfoalkyl esters, e.g., methyl methacrylate (MMA), ethyl methacrylate (EMA), butyl methacrylate (BMA), hydroxyethyl methacrylate (HEMA), hydroxyethyl acrylate (HEA), hydroxypropyl methacrylate (HPMA), hydroxybutyl acrylate (HBA), methyl acrylate (MA), ethyl acrylate (EA), butyl acrylate (BA), 2-ethylhexyl acrylate (EHA), cyclohexyl methacrylate (CHMA) and phosphoalkyl methacrylates (e.g., PEM). "Styrenic monomers" include styrene, α-methylstyrene; 2-, 3-, or 4-alkylstyrenes, including methyl- and ethyl-styrenes.

The term "vinyl monomers" refers to monomers that contain a carbon-carbon double bond that is connected to a heteroatom such as nitrogen or oxygen. Examples of vinyl monomers include, but are not limited to, vinyl acetate, vinyl formamide, vinyl acetamide, vinyl pyrrolidone, vinyl caprolactam, and long chain vinyl alkanoates such as vinyl neodecanoate, and vinyl stearate.

Preferably, the polymeric particles have a Vicker's scale hardness from 150 to 600 Kgf/mm$^2$, preferably from 200 to 500 Kgf/mm$^2$, preferably from 240 to 400 Kgf/mm$^2$ Vicker's hardness is measured using a standard hardness tester with a diamond tip. Hardness is determined from $H_v$=1.85444(P/d$^2$), where P is the load in kg and d$^2$ is the area of indentation in mm$^2$ Hardness for the particles of this invention was determined using the Shimadzu Micro Compression Testing Machine MCT 500.

Preferably, the polymeric particles are either: (a) particles having $T_g$ from 75 to 150° C.; (b) particles having at least 0.5% polymerized residues of crosslinkers; or a combination thereof. When the particles have a $T_g$ from −50° C. to 75° C., preferably the particles have at least 0.5% residues of crosslinkers, preferably at least 0.75%, preferably at least 1%, preferably at least 1.25%, preferably at least 1.5%, preferably at least 2%, preferably at least 3%, preferably at least 5%. Particles having $T_g$ from 75 to 150° C. may contain the amounts of crosslinker residues described above or may have much lower levels of crosslinker residues. The polymeric particles also may be highly crosslinked and have a high $T_g$, for example, particles formed by polymerization of divinylaromatic monomers (e.g., divinylbenzene), or monomer mixtures having large amounts of divinylaromatic monomers, preferably at least 30%, preferably at least 50%, preferably at least 70%, preferably at least 80%, in combination with other monomers, preferably styrenic or acrylic monomers.

Preferably, the polymeric particles have an average particle diameter of at least 0.8 µm, preferably at least 1 µm, preferably at least 1.5 µm, preferably at least 2 µm, preferably at least 2.5 µm; preferably, these particles have an average particle diameter no greater than 12 µm, preferably no greater than 10 µm, preferably no greater than 8 µm, preferably no greater than 6 µm, preferably no greater than 5 µm. Preferably, the polymeric particles have a particle size distribution indicating a single mode; preferably the width of the particle size distribution at half-height is from 0.1 to 3 μm, preferably from 0.2 to 1.5 μm. The composition or the film may contain particles having different average diameters provided that particles of each average diameter have a particle size distribution as described immediately above. The particle size distribution is determined using a particle size analyzer. Preferably, the polymeric particles and the film-forming polymer are combined in the form of multistage polymeric particles which have an average particle diameter of at least 1.5 μm, preferably at least 1.8 μm, preferably at least 2 μm, preferably at least 3 μm. Preferably, the multistage polymeric particles have an average particle diameter no greater than 20 μm, preferably no greater than 15 μm, preferably no greater than 12 μm, preferably no greater than 10 μm, preferably no greater than 9 μm, preferably no greater than 8 μm, preferably no greater than 7 μm. Preferably, the multistage polymeric particles are two-stage particles, i.e., at least 70% of the particle has the properties indicated herein for the polymeric particle and film-forming polymer, preferably at least 80%, preferably at least 90%, preferably at least 95%. The particle size distribution is determined using a particle size analyzer. Preferably, the polymeric particles in the film which have average particle diameters from 15 to 500 μm have an average particle diameter of at least 20 μm, preferably at least 50 μm, preferably at least 80 μm, preferably at least 110 μm, preferably at least 150 μm; preferably, these particles have an average particle diameter no greater than 400 μm, preferably no greater than 350 μm, preferably no greater than 300 μm, preferably no greater than 250 μm.

Preferably, the polymeric particle has $T_g$ from 75 to 150° C. Preferably, the polymeric particle has $T_g$ of at least 80° C., preferably at least 85° C., preferably at least 90° C., preferably at least 95° C. Preferably, the polymeric particle has $T_g$ no greater than 140° C., preferably no greater than 130° C., preferably no greater than 120° C. Preferably, the film-forming polymer or continuous polymeric phase has $T_g$ no greater than 50° C., preferably no greater than 40° C., preferably no greater than 30° C., preferably no greater than 20° C., preferably no greater than 10° C., preferably no greater than 0° C., preferably no greater than −10° C. Preferably, the polymeric outer layer or the continuous polymeric phase has $T_g$ of at least −50° C., preferably at least −40° C., preferably at least −30° C. Preferably the polymeric core or the polymeric particle in the film is one having a radial refractive index gradient ("GRIN" particle, see, e.g., US 20090097123). Preferably, GRIN particles have a refractive index at the center from 1.45 to 1.59, preferably from 1.45 to 1.55, preferably from 1.46 to 1.5; and a refractive index at the surface from 1.57 to 1.63, preferably from 1.58 to 1.62, preferably from 1.58 to 1.61.

Refractive index differences stated herein are absolute values. Preferably, the refractive index difference (i.e., the absolute value of the difference) measured from 800 nm to 2500 nm between the polymeric particle and the film-forming polymer, or between the polymeric particle and the continuous polymeric phase is at least 0.06, preferably at least 0.08, preferably at least 0.09, preferably at least 0.1. Preferably, the refractive index difference measured from 800 nm to 2500 nm between the polymeric particle and the film-forming polymer, or between the polymeric particle and the continuous polymeric phase is no greater than 0.2, preferably no greater than 0.17, preferably no greater than 0.15. Preferably, the refractive index difference measured from 400 nm to 800 nm between the polymeric particle and the film-forming polymer, or between the polymeric particle and the continuous polymeric phase is no greater than 0.015, preferably no greater than 0.01, preferably no greater than 0.005, preferably no greater than 0.003. Preferably, the refractive index of the polymeric particle is from 1.45 to 1.75, preferably from 1.5 to 1.67, preferably from 1.53 to 1.65. Preferably, the refractive index of the film-forming polymer or the continuous polymeric phase is from 1.4 to 1.6, preferably from 1.4 to 1.55, preferably from 1.42 to 1.52. Preferably, the refractive index of the polymeric particle is greater than the refractive index of the film-forming polymer or the continuous polymeric phase in the infrared region, i.e., from 800-2500 nm. When the polymeric particle is a GRIN particle, its refractive index for purposes of calculating a refractive index difference is the refractive index at the particle surface.

In the composition of this invention, the weight ratio of film-forming polymer to polymeric particles preferably is from 2:1 to 6:1, preferably from 2.2:1 to 3:1. In the continuous phase in the film, the average distance between the polymeric particles is the center-center distance between the particles. When the polymeric particles have an average diameter from 0.5 to 15 μm, preferably this distance is from 1 to 9 μm, preferably from 2 to 7 μm, preferably from 3 to 6 μm. When the polymeric particles have an average diameter from 15 to 100 μm, preferably this distance is from 15 to 100 μm, preferably from 20 to 90 μm, preferably from 25 to 75 μm. When the polymeric particles have an average diameter from greater than 100 μm to 500 μm, preferably this distance is from 100 to 300 μm, preferably from 120 to 250 μm, preferably from 150 to 200 μm.

Preferably, the film-forming polymer or the continuous polymeric phase comprises at least 60% polymerized residues of acrylic monomers, preferably at least 70%, preferably at least 80%, preferably at least 90%, preferably at least 95%. Preferably, the film-forming polymer or the continuous polymeric phase comprises from 35 to 70% polymerized residues of $C_4$-$C_{12}$ alkyl (meth)acrylate(s), preferably from 40 to 65%, preferably from 45 to 65%. Preferably, the $C_4$-$C_{12}$ alkyl (meth)acrylate(s) are $C_4$-$C_{12}$ alkyl acrylate(s), preferably $C_4$-$C_{10}$ alkyl acrylate(s), preferably BA and/or EHA. Preferably, the film-forming polymer or the continuous polymeric phase also comprises 30 to 65% polymerized residues of $C_1$-$C_4$ alkyl (meth)acrylate(s), preferably from 35 to 60%, preferably from 35 to 55%, and 0 to 5% polymerized residues of acid monomers (e.g., AA, MAA, IA, CA) and may also contain small amounts of residues of vinyl monomers. Preferably, the $C_1$-$C_4$ alkyl (meth)acrylate(s) are $C_1$-$C_2$ alkyl (meth)acrylate(s), preferably MMA and/or EMA. Preferably, the polymeric particle comprises at least 60% polymerized residues of styrenic monomers, preferably at least 70%, preferably at least 80%, preferably at least 90%, preferably at least 95%. Preferably, the polymeric particle also comprises 0 to 5% polymerized residues of acid monomers (e.g., AA, MAA, IA, CA), preferably 0.5 to 4% AA and/or MAA, and may also contain small amounts of residues of vinyl monomers.

Crosslinkers are monomers having two or more ethylenically unsaturated groups, or coupling agents (e.g., silanes) or ionic crosslinkers (e.g., metal oxides). Crosslinkers having two or more ethylenically unsaturated groups may include, e.g., divinylaromatic compounds, di-, tri- and tetra-(meth)acrylate esters, di-, tri- and tetra-allyl ether or ester compounds and allyl (meth)acrylate. Preferred examples of such monomers include divinylbenzene (DVB), trimethylolpropane diallyl ether, tetraallyl pentaerythritol, triallyl pentaerythritol, diallyl pentaerythritol, diallyl phthalate, diallyl maleate, triallyl cyanurate, Bisphenol A diallyl ether, allyl sucroses, methylene bisacrylamide, trimethylolpropane triacrylate, allyl methacrylate (ALMA), ethylene glycol dimethacrylate (EGDMA), hexane-1,6-diol diacrylate (HDDA) and butylene glycol dimethacrylate (BGDMA). Preferably, the amount of polymerized crosslinker residue in the film-forming polymer or the continuous polymeric phase is no more than 0.2%, preferably no more than 0.1%, preferably no more than 0.05%, preferably no more than 0.02%, preferably no more than 0.01%. Preferably, the amount of polymerized crosslinker residue in the polymeric particle having $T_g$ from 75 to 150° C. is no more than 0.5%, preferably no more than 0.3%, preferably no more than 0.2%, preferably no more than 0.1%, preferably no more than 0.05%. Preferably, if crosslinkers are present, they have a molecular weight from 100 to 250, preferably from 110 to 230, preferably from 110 to 200, preferably from 115 to 160. Preferably, crosslinkers are difunctional or trifunctional, i.e., they are diethylenically or triethylenically unsaturated, respectively, preferably difunctional.

Preferably, the composition of this invention is an aqueous emulsion of the polymeric particles of this invention, preferably at a solids level from 35 to 65%, preferably from 40 to 60%. When the polymeric particles and the film-forming polymer are combined in a multistage particle, preferably the composition is produced from the appropriate monomers by multi-stage emulsion polymerization. Preferably there are two polymerization stages in which different monomer compositions are introduced into the polymerization, although the particles may be made in more stages providing the overall composition is as indicated herein. Preferably, the composition and the film are substantially free of pigments or solid inorganic particles, i.e., they have less than 0.5 wt %, preferably less than 0.2 wt %, preferably less than 0.1 wt %, preferably less than 0.05 wt %.

Preferably, the film comprising polymeric particles of the present invention is produced by coating an aqueous emulsion of the multistage polymeric particles of this invention onto a solid substrate and allowing the coating to dry. Preferably, the substrate is glass, wood, leather or an optically clear plastic, e.g., poly(ethyleneterephthalate); preferably glass or an optically clear plastic. Preferably, the refractive indices of plastics and glasses for this application vary from a minimum of: 1.4 for (poly(vinylidene)fluoride to 1.8 for glass doped with thallium oxide ($Tl_2O$). Preferably, the wet coating has a thickness from 2 to 30 mils (0.05 to 0.76 mm), preferably from 4 to 20 mils (0.1 to 50 mm), preferably from 6 to 12 mils (0.15 to 0.3 mm). It is believed that the polymeric particles having average diameter from 0.5 to 15 µm associate to produce a matrix of cores in a substantially face-centered cubic or hexagonal close packed arrangement with the outer layer forming the continuous polymeric phase.

EXAMPLES

Example 1

The polymeric spheres used in our design of the photonic crystals are synthesized from divinylbenzene and methyl methacrylate and butyl acrylate monomers. The spheres are synthesized by a unique propriety polymerization process to yield the discrete GRIN morphology described below for the self focusing lens.

This step illustrates the preparation of non-crosslinked polymer pre-seeds 0.25 µm in diameter for making large seed particles in aqueous dispersion. The following mixtures A-C were prepared with deionized water:

| Mixture | Component | Parts by Weight |
|---|---|---|
| A1 | Water | 400 |
|  | Sodium Carbonate | 1.2 |
| B1 | n-Butyl Acrylate | 300 |
|  | 10.0% aqueous Sodium Dodecylbenzenesulfonate | 15.0 |
|  | Water | 60 |
| C1 | Sodium Persulfate | 72 |
|  | Water | 11.9 |

A reactor equipped with stirrer and condenser and blanked with nitrogen was charged with Mixture A1 and heated to 83° C. To the reactor contents was added 10% of emulsified Mixture B1 and 25% of Mixture C1. The temperature was maintained at 83° C. and the mixture was stirred for 60 minutes, after which the remaining Mixture B1 and Mixture C1 were added to the reactor with stirring over a period of 180 minutes. Stirring was continued at 83° C. for 30 minutes, after which the reactor contents were cooled to room temperature. The average particle size of the resulting particle pre-seeds was 0.25 µm as measured by a BROOKHAVEN INSTRUMENTS particle size analyzer BI-90.

In this step the pre-seed particles in the emulsion of the initial step are grown to 0.65 µm diameter using n-butyl acrylate, styrene, and Butyl 3-Mercaptopropionate. The following mixtures A2-G2 were prepared with deionized water:

| Mixture | Component | Parts by Weight |
|---|---|---|
| A2 | Sodium Nitrate | 0.24 |
|  | Polyvinyl Alcohol 5% Solution | 150.0 |
|  | Water | 400.0 |
| B2 | 31.92% aqueous emulsion from Example 1 | 43.7 |
| C2 | n-Butyl Acrylate | 245.4 |
|  | Styrene | 54.6 |
|  | Polyvinyl Alcohol 5% Solution | 90.0 |
|  | Buty 3-Mercaptopropionate | 72.0 |
|  | Water | 290.0 |
| D2 | t-Butyl Peroctoate | 3.24 |
|  | Polyvinyl Alcohol 5% Solution | 60.0 |
|  | Water | 60.0 |
| E2 | t-Butyl Hydroperoxide 70% | 0.15 |
|  | Water | 30 |
| F2 | Sodium Formaldehyde Sulfoxylate | 0.18 |
|  | Water | 30 |

Mixture A2 was added to the reactor of the first step and heated to 85° C. with stirring. The air in the reactor was replaced by nitrogen. When the reactor temperature stabilized at 85° C., Mixture B2 was charged into the reactor. Emulsified Mixtures C2 and D2 were homogenized before added to reactor. Feed gradually homogenized mixture of C2 and D2 over a period of 360 minutes. Stirring was continued at 85° C. for 90 minutes. The reactor contents were cooled to 65° C. Mixtures E2 and F2 were added and the reactor contents were maintained at 65° C. with stirring for 1 hour, after which the reactor contents were cooled to room temperature. The resulting emulsion particles had a diameter of 0.65 µm as measured by a BROOKHAVEN INSTRUMENTS particle size analyzer BI-90.

In this third step, the particles in the emulsion of step two are expanded to create 3 µm diameter converging lenses using divinylbenzene in Stage I which is then followed by Stage II copolymerization of methyl methacrylate and Butyl acrylate. The following mixtures A3-G3 were prepared with deionized water:

| Mixture | Component | Parts by weight, g |
|---|---|---|
| | Stage I | |
| A3 | Water | 250 |
| B3 | PVP 8% solution | 250 |
| | Aqueous emulsion from Example 2 at 34.77% solids | 2.57 |
| C3 | DVB | 1600 |
| | 10% aqueous Sodium Dodecylbenzenesulfonate | 11.52 |
| | Water | 64 |
| D3 | t-Butyl Peroctoate | 0.96 |
| | 10% aqueous Sodium Dodecylbenzenesulfonate | 1.28 |
| | Water | 15 |
| | Stage II | |
| E3 | Methyl Methacrylate | 20 |
| | Butyl Acrylate | 20 |
| F3 | Sodium Formaldehyde Sulfoxylate | 0.24 |
| | Water | 60 |
| G3 | t-Butyl Hydroperoxide 70% | 0.36 |
| | Water | 30 |

To the reactor of the initial step was added A3 which was heated to 55° C. with stirring. The air in the reactor was replaced by nitrogen. When the reactor temperature stabilized at 55° C., Mixture B3 was charged into the reactor. Mixture C3 was emulsified with a homogenizer and charged into the reactor. The reactor was stirred at 55° C. for 1 hour. Mixture D3 was emulsified with a homogenizer and charged into the reactor. After 1 hour agitation at 55° C., the reactor was gradually heated to 65-87° C. while an exothermic polymerization takes place. After reaching peak temperature, agitation was continued while the reactor was cooled to 73° C. in 30 minutes. Charge half of Mixture F3. Mixtures E3, the remainder of F3, and G3 were then separately added into the reactor over a period of 2 hours. The temperature was maintained between 73-75° C. and stirring was continued for 1 hour before the reactor was cooled to room temperature. The resulting emulsion particles, had a diameter of 3.834 μm as measured by a COULTER CORPORATION MULTISIZER IIE particle size analyzer.

Comparative Example 2

Polycarbonate resin (LEXAN-141; RI=1.59) was melt compounded in a Leistritz extruder at barrel temperatures that range from 190 to 288° C. The melt compounding was followed by pelletization, drying, at 60° C. in a vacuum oven, and injection molding at temperatures between 250 and 270° C. The test plates, derived from injection molding, were of the following dimension: 77 mm×56 mm×3 mm. These plates were evaluated by ASTM D 10003-00 (Standard test method for haze and luminous transmittance of transparent plastics) and ASTM E 313-00 (Standard practice for calculating yellowness and whiteness indices from instrumentally measured color coordinates). The UV/Vis transmission was measured by a model U-2000 double-beam UV/Vis spectrophotometer.

Example 3

An aqueous dispersion, prepared by the process described in Example 1 and comprising of spherical particles of chemical composition, DVB(80%)//20% (MMA/BA=1:1), and 3.8 μm average diameter, was coated onto a Polycarbonate plaque (LEXAN-141; RI=1.59) that was prepared by melt compounding in a Leistritz extruder at barrel temperatures that range from 190 to 288° C. and injection molding at temperatures between 250 and 270° C. The test plates, derived from injection molding, were of the following dimension: 77 mm×56 mm×3 mm. The percent transmission at discrete wavelengths, was measured with a model U-2000 double-beam UV/Vis spectrophotometer. Reflectance data are presented in the table below Ex. 5.

Example 4

An aqueous dispersion, prepared by the process described in Example 1 and comprising of spherical particles of chemical composition, DVB(80%)//20% (MMA/BA=1:1), and 5.5 μm average diameter, was coated onto a Polycarbonate plaque (LEXAN-141; RI=1.59) that was prepared by melt compounding in a Leistritz extruder at barrel temperatures that range from 190 to 288° C. and injection molding at temperatures between 250 and 270° C. The test plates, derived from injection molding, were of the following dimension: 77 mm×56 mm×3 mm. The percent transmission at discrete wavelengths, was measured with a model U-2000 double-beam UV/Vis spectrophotometer. Reflectance data are presented in the table below Ex. 5.

Example 5

An aqueous dispersion, prepared by the process described in Example 1 and comprising of spherical particles of chemical composition, DVB(80%)//20% (MMA/EA=1:1), and 5.1 μm average diameter, was coated onto a Polycarbonate plaque (LEXAN-141; RI=1.59) that was prepared by melt compounding in a Leistritz extruder at barrel temperatures that range from 190 to 288° C. and injection molding at temperatures between 250 and 270° C. The test plates, derived from injection molding, were of the following dimension: 77 mm×56 mm×3 mm. The percent transmission at discrete wavelengths, was measured with a model U-2000 double-beam UV/Vis spectrophotometer. Reflectance data are presented in the table below Ex. 5.

| | UV (350 nm) | VIS (600 nm) | NIR (840 nm) | IR (1700 nm) |
|---|---|---|---|---|
| Comp. Ex. 2 | 21.12 | 83.95 | 87.90 | 82.69 |
| Ex. 3 | 0.03 | 11.68 | 33.98 | 52.43 |
| Ex. 4 | 0.06 | 34.25 | 56.69 | 80.40 |
| Ex. 5 | 0.04 | 18.13 | 37.84 | 61.43 |

(Reflectance in percent)

Example 6

This example illustrates the preparation of crosslinked polymer particles of 0.25 μm in diameter for making large seed particles in aqueous dispersion. The following mixtures were prepared with deionized water:

| Mixture | Component | Parts by Weight |
|---|---|---|
| A | Water | 180 |
| | Sodium Carbonate | 0.40 |
| B | n-Butyl Acrylate | 98.0 |
| | Allyl Methacrylate | 1.75 |
| | 1,4-Butanediol Diacrylate | 0.25 |
| | 22.5% aqueous Sodium Dodecylbenzenesulfonate | 2.22 |
| | Water | 40.8 |

-continued

| Mixture | Component | Parts by Weight |
|---|---|---|
| C | Sodium Persulfate | 0.06 |
|   | Water | 11.9 |

A reactor equipped with stirrer and condenser and blanked with nitrogen was charged with Mixture A and heated to 83° C. To the reactor contents was added 10% of emulsified Mixture B and 25% of Mixture C. The temperature was maintained at 83° C. and the mixture was stirred for 60 minutes, after which the remaining Mixture B and Mixture C were added to the reactor with stirring over a period of 120 minutes. Stirring was continued at 83° C. for 90 minutes, after which the reactor contents were cooled to room temperature. The particle size of the resulting particles was 0.25 µm as measured by a Brookhaven Instruments particle size analyzer BI-90.

Example 7

In this example the particles in the emulsion of Example 6 are grown to 0.56 µm diameter using n-butyl acrylate, styrene, and 1-hexanethiol. The following mixtures were prepared with deionized water:

| Mixture | Component | Parts by Weight |
|---|---|---|
| A | Sodium Carbonate | 0.08 |
|   | 9.76% aqueous Sodium Dodecylbenzenesulfonate | 0.01 |
|   | Water | 156.00 |
| B | 30.10% aqueous emulsion from Example 1 | 29.80 |
| C | n-Butyl Acrylate | 81.80 |
|   | Styrene | 18.20 |
|   | 9.76% aqueous Sodium Dodecylbenzenesulfonate | 4.53 |
|   | Water | 57.50 |
| D | 1-Hexanethiol | 18.80 |
|   | 9.76% aqueous Sodium Dodecylbenzenesulfonate | 0.58 |
|   | Water | 15.00 |
| E | Sodium Persulfate | 0.11 |
|   | Water | 47.40 |
| F | t-Butyl Hydroperoxide 70% | 0.30 |
|   | Water | 15.00 |
| G | Sodium Formaldehyde Sulfoxylate | 0.20 |
|   | Water | 6.67 |

Mixture A was added to the reactor of Example 6 and heated to 88° C. with stirring. The air in the reactor was replaced by nitrogen. When the reactor temperature stabilized at 88° C., Mixture B was charged into the reactor. Emulsified Mixtures C and D, and Mixture E were then added to the reactor, with stirring, over a period of 300 minutes. Stirring was continued at 88° C. for 90 minutes. The reactor contents were cooled to 65° C. Mixtures F and G were added and the reactor contents were maintained at 65° C. with stirring for 1 hour, after which the reactor contents were cooled to room temperature. The resulting emulsion particles had a diameter of 0.56 µm as measured by a Brookhaven Instruments particle size analyzer BI-90.

Example 8

In this example a procedure similar to Example 6 was used to prepare crosslinked polymer particles in aqueous emulsion containing 99.30 parts of n-butyl acrylate and 0.70 part of allyl methacrylate. The resulting emulsion had a solids content of 32.52% and a particle size of 0.054 µm.

Example 9

In this example the procedures in Example 7 were repeated using 1.42 part of the emulsion from Example 3. The resulting emulsion had a solids content of 30.16% and a particle size of 0.31 µm. The polymers derived from this synthesis recipe are as follows: (80% (BA/ALMA=94/6)//20% (MMA/BA=98/2)), particle size of 2.2 microns (9A); (80% (BA/ALMA=92/8)//20% (Styrene)), particle size of 2.1 microns (9B); (80% (BA/ALMA=94/6)//20% (Styrene)), particle size of 2.1 microns (9C); (80% (BA/ALMA=92/8)//20% (Styrene)), particle size of 2.2 microns (9D).

Comparative Example 10

PMMA resin (V-826-100; RI=1.49) was melt processed in a Leistritz extruder at barrel temperatures that range from 200 to 234° C. The melt processing was followed by pelletization, drying, at 60° C. in a vacuum oven, and injection molding at temperatures between 250 and 270° C. The test plates, derived from injection molding, were of the following dimension: 77 mm×56 mm×3 mm. These plates were evaluated by ASTM D 10003-00 (Standard test method for haze and luminous transmittance of transparent plastics) and ASTM E 313-00 (Standard practice for calculating yellowness and whiteness indices from instrumentally measured color coordinates). The UV/Vis transmission was measured by a model U-2000 double-beam UV/Vis spectrophotometer.

Examples 11-18

GRIN spheres of the compositions given in Example 9, were dry blended with PMMA resin (V-826-100; RI=1.49) followed by melt compounding in a Leistritz extruder at barrel temperatures that range from 200 to 234° C. The melt compounding was followed by pelletization, drying, at 60° C. in a vacuum oven, and injection molding at temperatures between 250 and 270° C. The test plates, derived from injection molding, were of the following dimension: 77 mm×56 mm×3 mm. These plates were evaluated by ASTM D 10003-00 (Standard test method for haze and luminous transmittance of transparent plastics) and ASTM E 313-00 (Standard practice for calculating yellowness and whiteness indices from instrumentally measured color coordinates). The UV/Vis transmission was measured by a model U-2000 double-beam UV/Vis spectrophotometer.

TABLE 5

Injection molded (2 mm thickness) samples of GRIN particles (0.15% & 0.30% loading against PMMA resin)

| Ex. | Composition | target size, µm | % T 600 nm | % T 350 nm | % T 250 nm |
|---|---|---|---|---|---|
| 10 | 100% PMMA | — | 99.8 | 71.6 | 0.0 |
| 11 | 0.15% loading of 80(BA 94/ALMA 6)//20(MMA 98/BA 2) | 2.2 | 84.2 | 34.5 | 0.0 |
| 12 | 0.15% loading of 80(BA 92/ALMA 8)//20(Styrene) | 2.1 | 99.5 | 56.8 | 0.0 |
| 13 | 0.15% loading of 80(BA 94/ALMA 6)//20(Styrene) | 2.1 | 99.5 | 48.1 | 0.0 |

TABLE 5-continued

Injection molded (2 mm thickness) samples of GRIN particles
(0.15% & 0.30% loading against PMMA resin)

| Ex. | Composition | target size, μm | % T 600 nm | % T 350 nm | % T 250 nm |
|---|---|---|---|---|---|
| 14 | 0.15% loading of 80(BA 94/ALMA 6)//20(Styrene) | 3.5 | 98.9 | 48.3 | 0.0 |
| 15 | 0.30% loading of 80(BA 94/ALMA 6)//20(MMA 98/BA 2) | 2.2 | 68.3 | 12.7 | 0.0 |
| 16 | 0.30% loading of 80(BA 92/ALMA 8)//20(Styrene) | 2.1 | 97.3 | 48.5 | 0.0 |
| 17 | 0.30% loading of 80(BA 94/ALMA 6)//20(Styrene) | 2.1 | 97.6 | 45.0 | 0.0 |
| 18 | 0.30% loading of 80(BA 94/ALMA 6)//20(Styrene) | 3.5 | 97.5 | 47.8 | 0.0 |

Comparative Example 19

PMMA resin (VS-100; RI=1.49) was melt processed in a Leistritz extruder at barrel temperatures that range from 200 to 234° C. The melt processing was followed by pelletization, drying, at 60° C. in a vacuum oven, and injection molding at temperatures between 250 and 270° C. The test plates, derived from injection molding, were of the following dimension: 58.6 mm×58.5 mm×2.11 mm. These plates were evaluated by ASTM D 10003-00 (Standard test method for haze and luminous transmittance of transparent plastics) and ASTM E 313-00 (Standard practice for calculating yellowness and whiteness indices from instrumentally measured color coordinates). The UV/Vis transmission was measured by a model U-2000 double-beam UV/Vis spectrophotometer.

Examples 20-31

GRIN spheres of the compositions given in Example 9, were dry blended with PMMA resin (V-826-100; RI=1.49) followed by melt compounding in a Leistritz extruder at barrel temperatures that range from 200 to 234° C. The melt compounding was followed by pelletization, drying, at 60° C. in a vacuum oven, and injection molding at temperatures between 250 and 270° C. The test plates, derived from injection molding, were of the following dimension: 77 mm×56 mm×3 mm. These plates were evaluated by ASTM D 10003-00 (Standard test method for haze and luminous transmittance of transparent plastics) and ASTM E 313-00 (Standard practice for calculating yellowness and whiteness indices from instrumentally measured color coordinates). The UV/Vis transmission was measured by a model U-2000 double-beam UV/Vis spectrophotometer.

TABLE 6

Injection molded (2 mm thickness) samples of GRIN particles
(0.15%, 0.30%, 1%, and 5% loading against PMMA resin)

| Ex. | Composition | % T 600 nm | % T 350 nm | % T 250 nm | Refl. 600 nm | Refl. 350 nm |
|---|---|---|---|---|---|---|
| 19 | 100% PMMA | 100.1 | 59.8 | 0.0 | 0.0 | 0.0 |
| 20 | 0.15% loading of 80(BA 92/ALMA 8)//20(Styrene) | 99.9 | 66.8 | 0.1 | 0.0 | 0.0 |
| 21 | 0.15% loading of 80(BA 94/ALMA 6)//20(Styrene) | 100.0 | 63.5 | 0.0 | 0.0 | 0.0 |
| 22 | 0.15% loading of 80(BA 94/ALMA 6)//20(Styrene) | 99.8 | 70.5 | 8.8 | 0.0 | 0.0 |
| 23 | 0.30% loading of 80(BA 92/ALMA 8)//20(Styrene) | 98.9 | 67.8 | 0.0 | 0.0 | 0.0 |
| 24 | 0.30% loading of 80(BA 94/ALMA 6)//20(Styrene) | 100.2 | 73.3 | 0.3 | 0.0 | 0.0 |
| 25 | 0.30% loading of 80(BA 94/ALMA 6)//20(Styrene) | 99.1 | 63.8 | 0.0 | 0.0 | 0.0 |
| 26 | 1% loading of 80(BA 92/ALMA 8)//20(Styrene) | 97.5 | 66.9 | 0.0 | 0.0 | 0.0 |
| 27 | 1% loading of 80(BA 94/ALMA 6)//20(Styrene) | 100.6 | 51.1 | 0.0 | 0.0 | 0.0 |
| 28 | 1% loading of 80(BA 94/ALMA 6)//20(Styrene) | 99.3 | 44.4 | 0.0 | 0.0 | 0.0 |
| 29 | 5% loading of 80(BA 92/ALMA 8)//20(Styrene) | 82.2 | 71.6 | 0.0 | 4.0 | 0.7 |
| 30 | 5% loading of 80(BA 94/ALMA 6)//20(Styrene) | 97.3 | 15.1 | 0.0 | 0.9 | 0.0 |
| 31 | 5% loading of 80(BA 94/ALMA 6)//20(Styrene) | 85.8 | 5.3 | 0.0 | 3.8 | 2.4 |

The targeted size for Examples 20-31 was 3.5 μm

Comparative Example 32

Polycarbonate resin (LEXAN-141; RI=1.59) was melt compounded in a Leistritz extruder at barrel temperatures that range from 190 to 288° C. The melt compounding was followed by pelletization, drying, at 60° C. in a vacuum oven, and injection molding at temperatures between 250 and 270° C. The test plates, derived from injection molding, were of the following dimension: 77 mm×56 mm×3 mm. These plates were evaluated by ASTM D 10003-00 (Standard test method for haze and luminous transmittance of transparent plastics) and ASTM E 313-00 (Standard practice for calculating yellowness and whiteness indices from instrumentally measured color coordinates).
The UV/Vis transmission was measured by a model U-2000 double-beam UV/Vis spectrophotometer.

Comparative Example 33-35

Plain spheres of homogeneous refractive index (RI=1.4914 (Ex. 33), 1.4931 (Ex. 34), 1.4949 (Ex. 35) of the compositions given in TABLE 7, were dry blended, 25 weight percent, in Polycarbonate resin (LEXAN-141; RI=1.59) followed by melt compounding in a Leistritz extruder at barrel temperatures that range from 190 to 288° C. The melt compounding was followed by pelletization, drying, at 60° C. in a vacuum oven, and injection molding at temperatures between 250 and 270° C. The test plates, derived from injection molding, were of the following dimension: 77 mm×56 mm×3 mm. These plates were evaluated by ASTM D 10003-00 (Standard test method for haze and luminous transmittance of transparent plastics) and ASTM E 313-00 (Standard practice for calculating yellowness and whiteness indices from instrumentally measured color coordinates). The UV/Vis transmission was measured by a model U-2000 double-beam UV/Vis spectrophotometer.

Example 36

GRIN beads of the compositions given in Table 7, were dry blended in polycarbonate resin (LEXAN 141; RI=1.59) followed by melt compounding in a Leistritz extruder at barrel temperature ranging from 190 to 288° C. The melt compounding was followed by pelletization, drying, at 60 C in a vacuum oven, and injection molding at temperatures between 250 and 270° C. The test plates derived from injection molding are of the following dimension: 77 mm×56 mm×3 mm. These plates were evaluated by ASTM D 10003-00 (Standard test method for haze and luminous transmittance of transparent plastics) and ASTM E 313-00 (Standard practice for calculating yellowness and whiteness indices from instrumentally measured color coordinates). The optical properties were evaluated by a UV/Vis spectrophotometer.

TABLE 7

Injection molded samples using co-polymers at 25% w/w against Polycarbonate

| Ex | Composition (Polycarbonate resin for compounding) | % T 600 nm | % T 840 nm | % T 1200 nm | % Refl. 600 nm | % Refl. 840 nm | % Refl. 1200 nm |
|---|---|---|---|---|---|---|---|
| 32 | 100% Polycarbonate | 90.6 | 89.0 | 88.0 | 0.0 | 0.0 | 0.0 |
| 33 | 25% MMA/CHMA (90/10) | 44.2 | 50.0 | 48.0 | 52.0 | 51.0 | 42.0 |
| 34 | 25% MMA/CHMA (80/20) | 41.9 | 48.0 | 42.0 | 55.0 | 52.0 | 44.0 |
| 35 | 25% MMA/CHMA (70/30) | 37.3 | 46.0 | 40.0 | 51.5 | 50.0 | 42.0 |
| 36 | 25% BA/ALMA (96/4)// MMA/EA (96/4) | 32.9 | 39.0 | 26.0 | 68.0 | 66.0 | 56.0 |

The targeted size for Examples 32-36 was 5 μm

The low percent transmission at 600 nm measured for the particles described in Examples 33-36 occurred due to the large difference in refractive index between the acrylic particles (RI=1.49) and the polycarbonate matrix (RI=1.58) in the visible region.

Example 37

Film Made from Ion Exchange Resin Particles

The film composition and optical properties, listed in the table below, were derived from a mixture of an acrylic binder, 70 weight percent, of refractive index, 1.4813 and chemical composition given as: P(BA/MMA/HEMA/AA=54.6/29.8/10.6/5) (WR-97) and an ion exchange resin, 30 weight percent, of refractive index, 1.5913 and chemical composition given as: P(Styrene/d-vinyl benzene=95/5), all compositions are given in weight percent. The average particle size (diameter) of the IER resin is 210 μm. The example illustrates the optical properties of a Christiansen type band filter prepared from particles suspended in a host matrix. The film which is of at least 220 μm thick was drawn using a bird applicator onto a glass plate of dimension: 25×75×1 mm. The coated sample was dried in an oven at a temperature of 120° C. for 3 minutes. The UV/Vis transmission was measured by a model U-2000 double-beam UV/Vis spectrophotometer.

| Wavelength(nm) | STY-DVB/WR-97 (30%) |
|---|---|
| 600 | 29.7 |
| 840 | 24.5 |
| 1100 | 26 |

The low percent transmission at 600 nm measured for the film described in Example 37 occurred due to the large difference in refractive index between the styrenic particles (RI=1.59) and the acrylic matrix (RI=1.49) in the visible region.

The invention claimed is:

1. A film comprising polymeric particles having: (a) an average particle diameter from 15 to 500 μm; and (b) a Vicker's scale hardness from 100 to 700 Kgf/mm$^2$; and a film-forming polymer having $T_g$ no greater than 80° C.; wherein an average refractive index difference measured from 400 nm to 800 nm between the polymeric particles and the continuous polymeric phase is no greater than 0.02 and an average refractive index difference measured from 800 nm to 2500 nm between the polymeric particles and the continuous polymeric phase is at least 0.04.

2. The film of claim 1 in which the average particle diameter is from 110 to 300 μm and the refractive index difference measured from 400 nm to 800 nm between the polymeric particles and the continuous polymeric phase is no greater than 0.01 and the average refractive index difference measured from 800 nm to 2500 nm between the polymeric particles and the continuous polymeric phase is at least 0.08.

3. The film of claim 2 in which the polymeric particles have a refractive index gradient from 1.57 to 1.63.

4. The film of claim 3 in which the polymeric particles are: (a) particles having $T_g$ from 75 to 150° C.; (b) particles having at least 0.5% polymerized residues of crosslinkers; or (c) a combination thereof.

5. The film of claim 4 in which the polymeric particles have $T_g$ from 75 to 150° C.

6. The film of claim 5 in which a weight ratio of the continuous polymeric phase to polymeric particles is from 2.2:1 to 3:1.

7. The film of claim 6 in which the polymeric particles have a radial refractive index gradient wherein the particles have a refractive index at the center from 1.45 to 1.55 and a refractive index at the surface from 1.58 to 1.62.

8. The film of claim 7 in which the film is substantially free of pigments or solid inorganic particles.

* * * * *